United States Patent [19]

Lawson

[11] Patent Number: 5,610,324
[45] Date of Patent: Mar. 11, 1997

[54] FUGITIVE EMISSIONS INDICATING DEVICE

[75] Inventor: Rick A. Lawson, Houston, Tex.

[73] Assignee: Fugitive Emissions Detection Devices, Inc., Spring, Tex.

[21] Appl. No.: 341,419

[22] Filed: Nov. 17, 1994

Related U.S. Application Data

[63] Continuation-in-part of Ser. No. 148,997, Nov. 8, 1993, abandoned.

[51] Int. Cl.$^6$ .................... G01N 27/04; G01M 3/04; G01M 3/28
[52] U.S. Cl. .................... 73/46; 73/40; 340/605
[58] Field of Search .................... 73/46, 40, 49.2, 73/40.5 R; 340/605

[56]  References Cited

U.S. PATENT DOCUMENTS

| | | | |
|---|---|---|---|
| 1,559,461 | 10/1925 | Ruben | 338/34 |
| 2,460,215 | 1/1949 | Chase | 99/192 |
| 2,766,614 | 10/1956 | Cook | 73/46 |
| 2,817,230 | 12/1957 | McCully | 73/46 |
| 2,954,797 | 10/1960 | Dryer | 137/312 |
| 3,045,198 | 7/1962 | Dolan | 338/13 |
| 3,247,478 | 4/1966 | Craig | 338/35 |
| 3,485,085 | 12/1969 | Hawkins, Jr. | 73/46 |
| 3,507,145 | 4/1970 | Loh | 73/23 |
| 3,767,519 | 10/1973 | Kojima et al. | 161/168 |
| 3,879,985 | 4/1975 | Maslen | 73/27 R |
| 4,019,371 | 4/1977 | Chaplin et al. | 73/46 |
| 4,129,030 | 12/1978 | Dolan | 73/23 |
| 4,194,389 | 3/1980 | Laging | 73/46 |
| 4,224,595 | 9/1980 | Dolan | 338/34 |
| 4,232,736 | 11/1980 | Pillette | 166/53 |
| 4,237,721 | 12/1980 | Dolan | 73/23 |
| 4,282,743 | 8/1981 | Pickett | 73/46 |
| 4,295,669 | 10/1981 | LaPrade et al. | 285/47 |
| 4,458,521 | 7/1984 | Pillette | 73/46 |
| 4,466,273 | 8/1984 | Pillette | 73/46 |
| 4,507,954 | 4/1985 | Boutwell | 73/40.7 |
| 4,557,139 | 12/1985 | Cantwell et al. | 73/40.7 |
| 4,601,194 | 7/1986 | Miller et al. | 73/40.7 |
| 4,727,749 | 3/1988 | Miller et al. | 73/46 |
| 4,864,847 | 9/1989 | Anderson et al. | 73/40.7 |
| 4,876,884 | 10/1989 | Jansch | 73/49.1 |
| 4,926,680 | 5/1990 | Hasha et al. | 73/46 |
| 5,170,659 | 12/1992 | Kemp | 73/46 |
| 5,209,105 | 5/1993 | Hasha et al. | 73/49.1 |
| 5,330,720 | 7/1994 | Sorbo et al. | 422/98 |
| 5,348,044 | 9/1994 | Eugene et al. | 137/312 |

FOREIGN PATENT DOCUMENTS

63-289434  11/1988  Japan .

*Primary Examiner*—Hezron E. Williams
*Assistant Examiner*—J. David Wiggins
*Attorney, Agent, or Firm*—Bardehle, Pagenberg, Dost, Altenburg, Frohwitter, Geissler and Partner

[57]  ABSTRACT

A monitoring device and system for detecting fugitive emissions including emissions from valves and bolted flange connections. The monitoring device includes (1) an enclosure with gaskets to seal the air space around the valve or between the members of the flange, and (2) an indicating cartridge installed contains material which will register a change if emissions leak into the enclosed air space.

14 Claims, 8 Drawing Sheets

FUGITIVE EMISSIONS INDICATING DEVICE

This is a continuation-in-part application of application Ser. No. 08/148,997, filed on Nov. 8, 1993 which later became abandoned on Nov. 11, 1994.

TECHNICAL FIELD

The present invention is directed to the containment and detection of fugitive emissions, for example, leaking from valves and bolted flange connections. Also, the present invention is directed to a system for detecting and monitoring emissions. In another embodiment, the present invention relates to enclosures for valves and pipe connections or joints. In another aspect, the present invention relates to novel detectors for the detection of fugitive emissions.

BACKGROUND OF THE INVENTION

One of the major environmental concerns is the amount of polluting emissions which are leaked directly into the atmosphere due to failure of present systems. The existing systems are expensive and technically inadequate. It is believed that the two primary sources responsible for over 95% of industrial fugitive emissions are valve stuffing boxes and bolted pipe flange connections used in the oil and gas, and petrochemical industries.

One example of present state of the art in detection systems includes equipment which monitors large areas; such equipment detects leaks only after the emissions have entered the atmosphere. Another detection system requires an individual to use small, hand-held units in order to detect leaks. This method is unreliable, especially if detection takes place in the presence of even a small cross wind. Both methods allow leakage to continue for significant periods of time before detection and correction can occur. The ever stricter standards set by environmental agencies has led to the need for a more effective and efficient monitoring system for fugitive emissions. The present invention provides a solution to eliminate 95% of the fugitive emissions.

SUMMARY OF THE INVENTION

The present invention is directed to a monitoring system which detects fugitive emissions, for example, those leaking from valves and bolted flange connections in the oil and gas, and petrochemical industries. The invention is also directed to systems applicable in the chemical, pharmaceutical and the food processing industries. The system of the present invention is comprised of a set of enclosures, a set of detectors for the enclosures, a set of transmitters in communication with the detectors, and a central processing location for monitoring the status of the enclosed sites.

The present invention is also directed to novel enclosures for pipe flange connections and valve stuffing boxes as used in the oil and gas, and petrochemical industries. The pipe flange connection enclosures are comprised of members, preferably two semi-circle shaped members, which when combined encompass the flange connection. The members have internal channels, i.e., first, second, and third channels wherein the second channel is in between the first and third channels. The first and third channels hold gaskets or seals such that when the semi-circle members are joined around or encompass a pipe flange connection, the second channel forms an air-tight enclosure enclosing the gasket area between the pipe flanges of the connection. The second channel of one of the members includes a port for sealably receiving a detector of the present invention. Alternatively, one of the members also includes a port in the middle or second channel for receiving a vent plug.

The present invention is also directed to new enclosures for valve stuffing boxes. The valve stuffing box enclosures are preferably comprised of two members or half-pieces preferably shaped when joined like a hollow, frustrum, i.e., it is frustro-conical in shape. Each member includes gaskets or seals around the inside top portion, i.e., the narrow end of the frustrum and at the inside bottom portion, i.e., the wider end of the frustrum. In addition, one member of the pair includes lengthwise channels for receiving the other member having lengthwise gaskets or seals. The valve stuffing box enclosure is preferably used in conjunction with the pipe flange connection enclosure. The valve stuffing box enclosure is designed to overlap and connect to the pipe flange enclosure forming a heretofore unknown and unrealized combination for the containment and detection of emissions from valve stuffing boxes.

The present invention is also directed to a heretofore unknown adsorption detector. The preferred detector is comprised of a metal substrate, electrode elements, carbon, and an elastomer. Preferably, the detector is operated in a non-current saturated mode and can detect substances having a Van der Waals "a" constant of less than about 9. In some systems, for example, smaller systems, an indicating cartridge can be used as the detector. For instance, chemical-treated granules affixed to paper or chemical granules will change color when a threshold emission occurs. The indicator material or detector is enclosed in a housing, like a cylinder, which is installed or connected to the enclosures of the present invention.

It is the main object of the present invention to provide a monitoring system to detect emissions before any significant amounts reach the atmosphere which is both convenient and inexpensive to use.

It is another object of the present invention to provide a monitoring system for valve stuffing boxes and pipe flange connections as used in the oil and gas and petrochemical industries.

It is another object of this invention is to provide novel enclosures for pipe flange connections and valve stuffing boxes.

It is another object of the present invention is to provide a novel adsorption detector for detecting fugitive emissions.

DESCRIPTION OF THE PREFERRED EMBODIMENTS

Figure 1A:
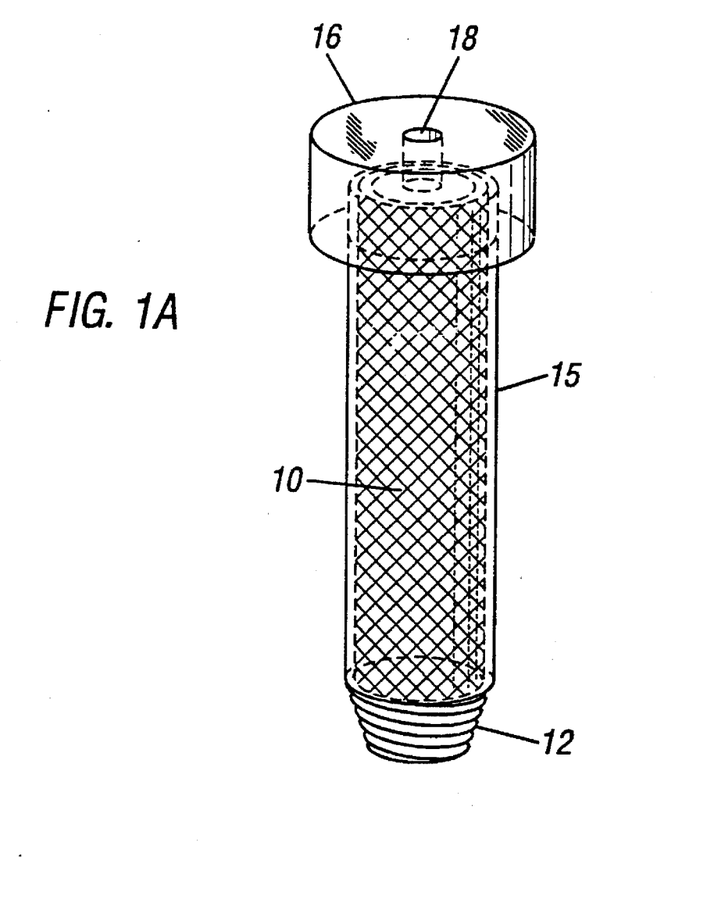
FIG. 1A is a see-through, perspective view of the fugitive emissions detection cylinder.

FIG. 1A shows the emissions indicating strip 10 contained within an acrylic cylinder 15. The emissions indicating strip 10 is chemically-treated paper, here shown in the shape of a tube; the paper will disclose a color change when emissions react with the chemical present on the surface of the paper (for example, paper treated with litmus will show a color change from red to blue when exposed to ammonia). Similarly, chemically-treated granules would change color upon reaction with emissions, or emissions would actuate a gas detector which would trip a relay and activate a light to switch on, also within the acrylic cylinder. The lower portion of the cylinder 15 has threads 12 for insertion into the stuffing box enclosure coupling 30, or into the flange enclosure coupling 40. Cylinder cap 16 seals cylinder 15 and has a one-way cylinder cap vent 18 to relieve any pressure build-up from within the stuffing box enclosure or flange enclosure.

Figure 1B:
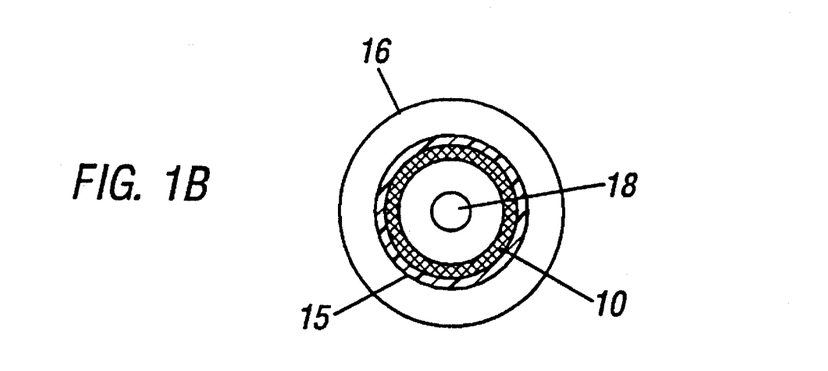
FIG. 1B is a cross-sectional view of the cylinder in FIG. 1A.

FIG. 1B is a cross-sectional view of the cylinder 15, showing the emissions indicating strip 10 contained within it, as well as the cylinder cap 16 and the cylinder cap vent 18.

Figure 2A:
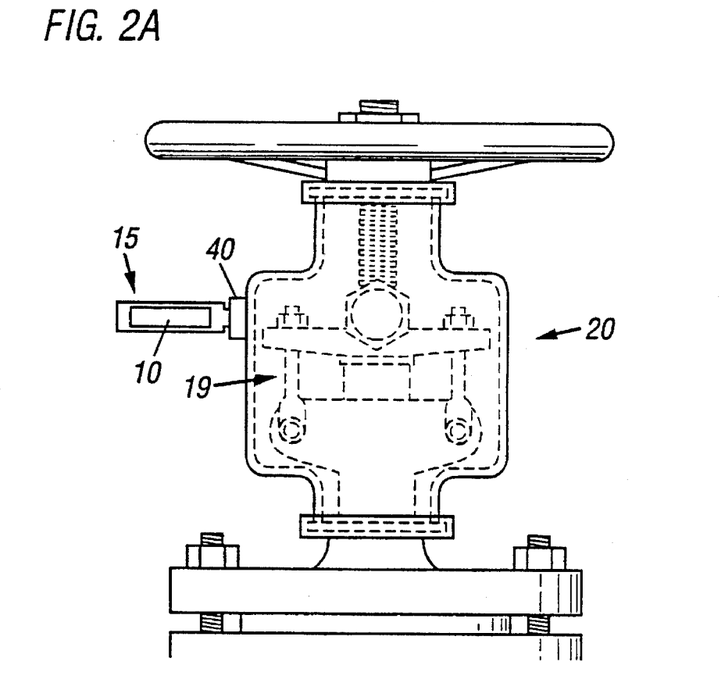
FIG. 2 is a side view of two applications of the invention, one enclosing the valve stuffing box, and one enclosing the flange.
Figure 2B:
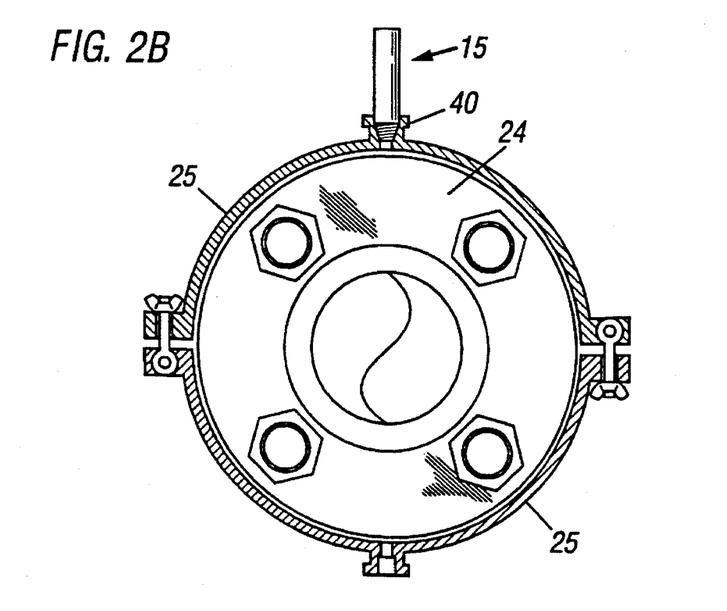

FIG. 2 shows two applications of the invention. The left-hand side of FIG. 2 shows the stuffing box enclosure housing 20 enclosing the valve stuffing box 19. A cylinder 15 containing emissions indicating strip 10 has been inserted into the stuffing box enclosure coupling 20. The right-hand side of the drawing shows the flange enclosure housing 25 enclosing the flange connection 24. A cylinder 15 containing emissions indicating strip 10 or a detector (not shown) has been inserted into the flange enclosure coupling 40.

Figures 3A, 3B:
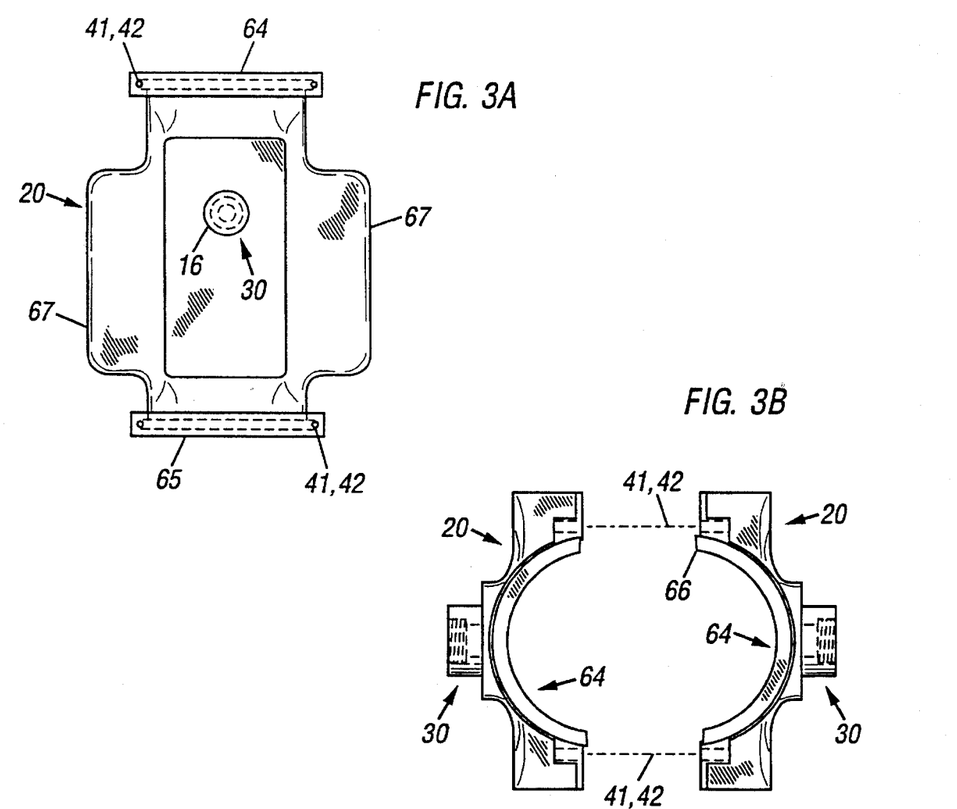
FIG. 3A is a cross-sectional side view of the valve stuffing box enclosure, showing the cap-end of the cylinder in place.
FIG. 3B is the cross-sectional top view of FIG. 3A, with the valve stuffing box enclosure in a disassembled state and the cylinder inserted in position.
Figure 3C:
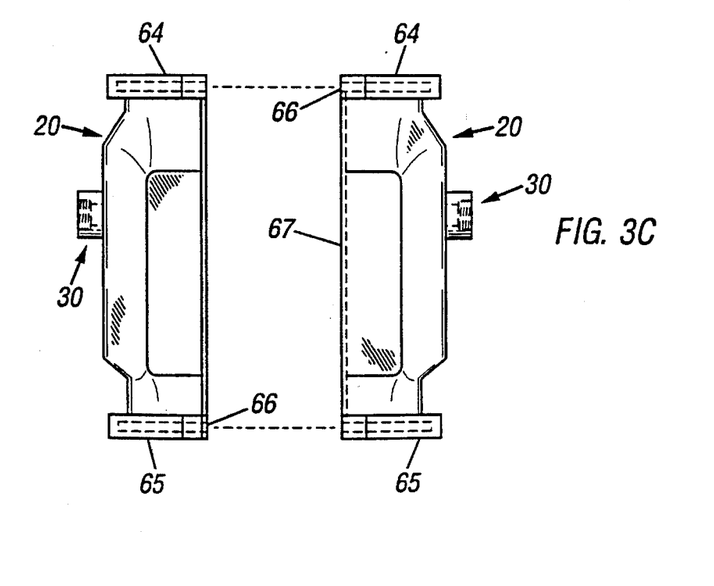
FIG. 3C is cross-sectional side view (FIG. 3A rotated 90° about a vertical axis) with the valve stuffing box enclosure in a disassembled state, and with the cylinder inserted in place.

FIG. 3A through 3C show views of the two-piece valve stuffing box enclosure, used for detecting emissions from the valve stuffing box. The stuffing box enclosure can be constructed of a material such as Ultem 1000. The two-piece construction allows the enclosure to be easily installed around the top and bottom of the yoke of the valve stuffing box. The seals, which can be made from a material such as silicone, together provide an air-tight seal to the area around the stuffing box and are designed to prevent outside air from entering the area contained within the stuffing box enclosure and possibly causing the indicating material to produce a false reading.

FIG. 3A is a cross-sectional side view of the stuffing box enclosure housing 20. Upper yoke gasket seal 64 and lower yoke gasket seal 65 provide seals between the stuffing box enclosure housing 20 and the valve stuffing box 19. The seal between the two halves of the stuffing box enclosure housing 20 is created by the stuffing box enclosure gasket seal 67. A screw and nut 41, 42 assembly is used to bolt together the two halves of the stuffing box enclosure housing 20. The stuffing box enclosure housing coupling 30 has threads to receive the threads 12 of cylinder 15.

FIG. 3B is a cross-sectional top view of the two halves of the stuffing box enclosing housing 20 before assembly. Each half has a yoke gasket seal 64, which forms a closed circle upon assembly. The seal is completed with the lip gasket seal 66. The path the screw and nut assembly 41, 42 follows is shown. Threaded stuffing box enclosure couplings 30 are shown on both sides of the stuffing box enclosure housing 20. (The lower yoke gasket seals 65 [not shown in FIG. 3b] on the lower portion of the stuffing box enclosure housing 20 look exactly like the upper yoke gasket seals 64.)

FIG. 3C is a cross-sectional side view of the stuffing box enclosure housing 20 in two halves (FIG. 3A rotated 90° about a vertical axis), showing the upper yoke gasket seals 64, the lower yoke gasket seals 65, the lip gasket seals 66, and the threaded stuffing box enclosure couplings 30. It also shows the stuffing box enclosure gasket seal 67, which creates the seal between the two halves of the stuffing box enclosure housing 20.

FIG. 4A through 4E show views of the preferred two-piece flange enclosure, used for detecting emissions from the flange. The flange enclosure can be constructed of a material such as Ultem 1000. The two-piece construction allows the enclosure to be easily installed by aligning the two halves over the space between the two members of the flange and securing the two halves together. The seals, which can be made from a material such as silicone, together provide an air-tight seal to the area around the flange and are designed to prevent any outside air from entering the area contained within the flange enclosure and possibly causing the indicating material or detector to produce a false reading.

Figure 4A:
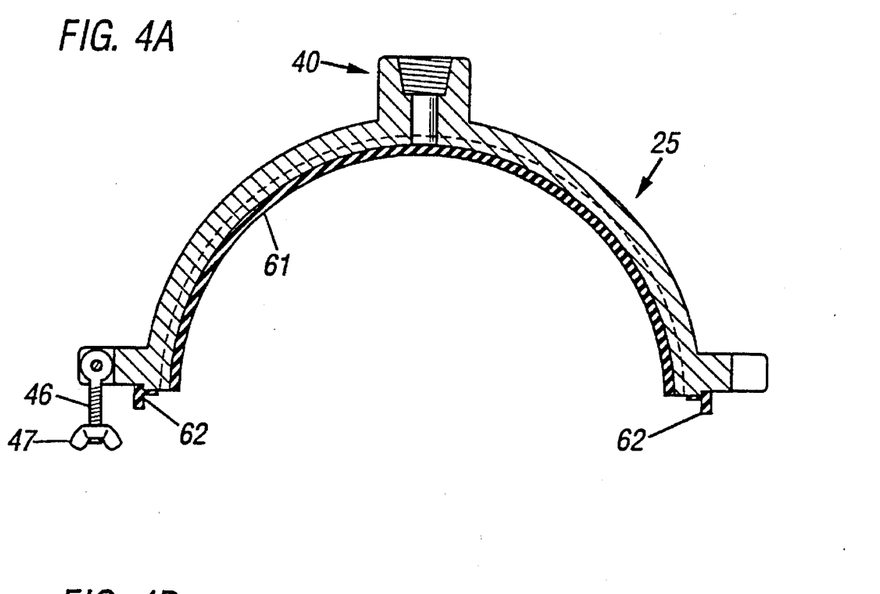
FIG. 4A is a cross-sectional view of one of the halves of the flange enclosure.

FIG. 4A shows a cross-sectional view of one of the halves of the flange enclosure housing 25 with threaded flange enclosure coupling 40. One of the flange enclosure gasket seals 61 can be seen running along the inside edge of flange enclosure housing 25. The flange enclosure connection seals 62 complete the seal when both halves of flange enclosure housing 25 are joined together with the wing and nut assembly 46, 47.

Figure 4B:
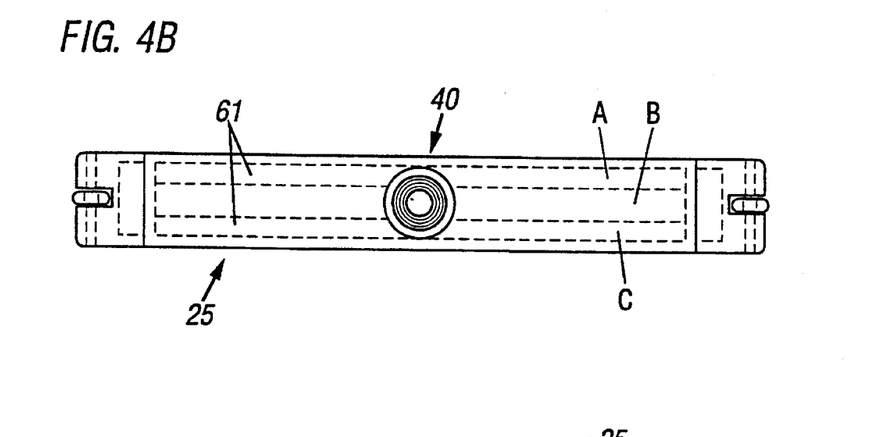
FIG. 4B is a top view of the flange enclosure, showing the threading of the half coupling.

FIG. 4B shows the top of one of the halves of flange enclosure housing 25 with the threaded flange enclosure coupling 40. The dotted lines show the placement of flange enclosure gasket seals 61 and flange enclosure connection seal 62 (on the underside of the flange enclosure housing 25).

Figure 4C:
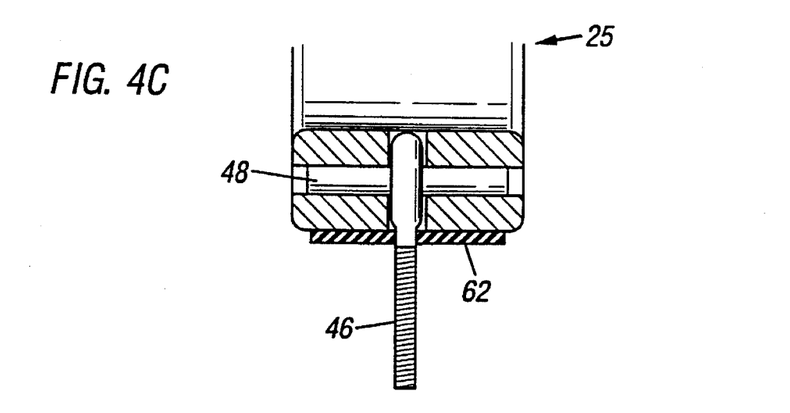
FIG. 4C shows a portion of FIG. 4A, rotated 90° about a horizontal axis.

FIG. 4C illustrates anchor pin 48 inserted into anchor pin hole 49, and eyebolt 46, which secure the two halves of flange enclosure housing 25 in place around the flange. FIG. 4C also shows the placement of flange enclosure connection seals 62.

Figure 4D:
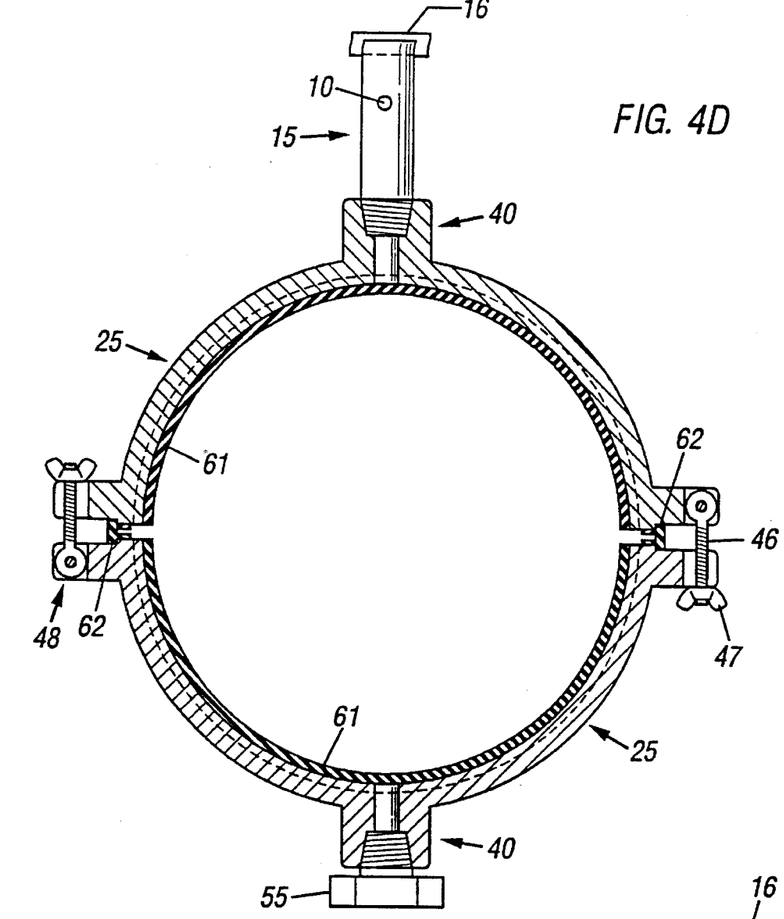
FIG. 4D is a cross-sectional view of the flange enclosure with the cylinder in place.

FIG. 4D shows both halves of flange enclosure housing 25 joined together with eyebolt 46, wing nut 47 and anchor pin 48. The flange enclosure gasket seal 61 forms a circle on the inside edge of the flange enclosure housing 25, and flange enclosure connection seals 62 complete the seal. The cylinder 15, containing emission indicating strip 10 or an adsorption detector (not shown) and sealed with cylinder cap 16, is shown threaded into one of the flange enclosure couplings 40. A flange coupling plug 55 has been threaded into the other flange enclosure coupling 40.

Figure 4E:
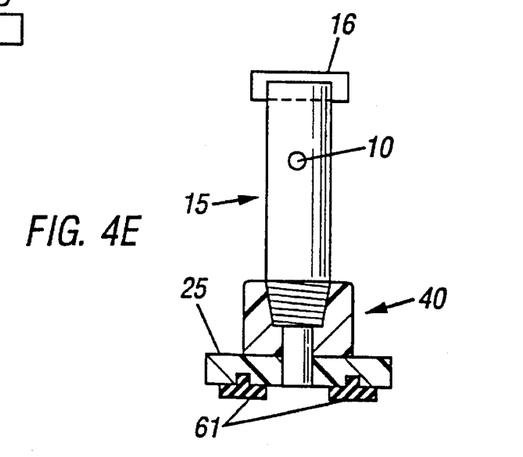
FIG. 4E is a cross-sectional view showing how the cylinder is installed in the half coupling.

FIG. 4E shows a cross-sectional side view of flange enclosure coupling 40 on flange enclosure housing 25. Cylinder 15, containing emission indicating strip 10 and sealed with cylinder cap 16, is threaded into flange enclosure coupling 40. The view shows that two flange enclosure gasket seals 61 run along the inside edge of flange enclosure housing 25, one on each outer edge of such housing, creating an enclosure space to contain emissions from the flange, which diffuse into the cylinder 15 and are detected by the emissions indicating strip 10.

The present invention is also directed to a system comprised of a set of enclosures, a set of emission detectors for the enclosures, and a set of transmitters for the enclosures. The enclosures of the present invention include enclosures for pipe flange connections and valve stuffing boxes. Referring to FIG. 4D, the pipe flange connection enclosures are preferably comprised of two semi-circle shaped members 25 or halves. The members can be constructed of various metals, like aluminum, or thermoplastics depending on the application. The members may vary in size depending upon the size or circumference of the pipe flange connection to be enclosed. Nevertheless, the members are of such a size such that when they combine, they encompass the pipe flange connection. Preferably, two members are used but the enclosure can be constructed of more than two members. As known in the art, a customary pipe flange connection includes two pipe flanges bolted together with a gasket positioned between the two flanges. As shown in FIG. 4B, members 25 of the enclosure of the present invention have first, second and third internal channels. The first and third channels hold gaskets and are sealed such that when the two members are joined to encompass the pipe flanges, the second channel, that is, the middle channel, forms an airtight enclosure around the gasket area between the two bolted pipe flanges. Referring to FIG. 4D, preferably, one of the members includes port 40 for sealably receiving a detector of the present invention. Alternatively, and preferably, the other member of the pair includes port 40 for receiving a vent plug.

The pipe flange connection enclosure may be secured around the pipe flange connection by any suitable means, e.g., a wing-nut assembly as shown in FIG. 4A or any other type of securing means including straps, buckles, latches, velcro, adhesives, bolts, screws, etc.

It should also be recognized that the pipe flange connection enclosure may also be constructed of a single unitary piece that is adjustable to form the appropriate desired enclosure around the gasket area between the two joined pipe flanges. This unitary construction obviously can be used at the point when the flanges are joined. The preferred embodiments have been described in relation to existing pipe flange connections, however, the same discussion and basic construction applies equally to unitary enclosures.

The enclosure of the present invention for a pipe flange connection may be comprised of: (a) a flange-enclosure assembled from two mirror-image half-clamps or semi-circle members, disposed around or encompassing the circular outer surfaces of the two connected flanges, each of the members having a threaded coupling and two extensions located at each end of the members oriented perpendicularly to the outer surface of the members; (b) a resilient seal ring is affixed to the outer edge of the inside diameter of each of the members; (c) another seal ring is affixed to the opposing outer edge of the inside diameter of each of the members such that when the members are disposed around the outer surfaces of the two flanges a seal is created; (d) a resilient gasket seal is affixed to the surface of the extensions of one of the members; (e) means for joining the two members thereby defining an air space between the flanges; (f) a cylindrical indicating cartridge with one open end having outer threads and an opposing end sealed with a one-way vent cap, the cartridge is designed to exhibit a change upon exposure of its contents with emissions from between the two the flanges, and the open end of said cartridge being threadably disposed in the coupling of one of the members; and (g) a plug threadably disposed in the coupling of the other, of the members.

The pipe flange connection enclosure members 25 may be constructed from extruded aluminum. The extrusion design allows for the acceptance of a standard closed cell foam sheet gasket material which is cut to fit in the grooves or internal channels of the extruded aluminum sheet. The extruded aluminum material is cut to the appropriate lengths and then rolled to whatever diameter that is necessary. The design preferably requires two identical members 25 or halves to enclose the outside diameter of mating flanges, with one gasket groove fitting on one side and the other gasket fitting on the other side, thus capturing any leak occurring in the gasket area between the mating flanges. Preferably, on each flange enclosure half 25, it will have a half-inch hole 40 drilled in order to accept either a vent plug or a detector or detector/transmitter assembly. The method of installation is to put one half of the flange enclosure on the topside of the mating flanges, and fit the other half of the flange enclosure on the bottom. A simple attaching mechanism is utilized to secure the two halves together around the mating flanges and compress the two halves together tight enough to prevent any outside ambient conditions, i.e., air-tight, from violating the airspace on the inside without creating a pressure containing part.

Figure 5:
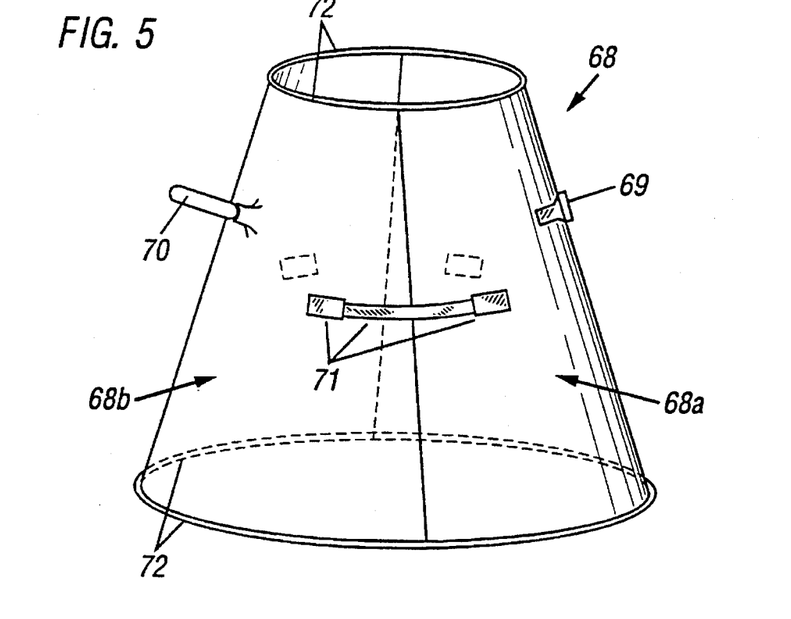
FIG. 5 is a perspective view of one embodiment of the valve stuffing box enclosure.
Figure 5A:
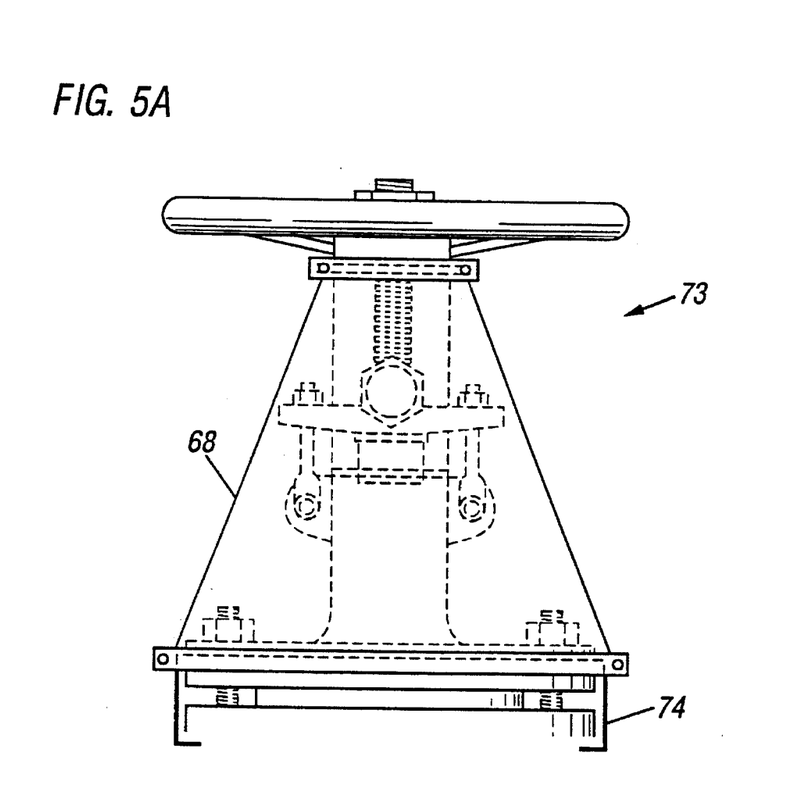
FIG. 5A is a perspective side view of a mounted valve stuffing box enclosure in conjunction with a pipe flange connection enclosure.

The present invention includes enclosures for valve stuffing boxes. (See FIGS. 3A, 3B, 3C, 5, and 5A) Referring to FIG. 5, the valve stuffing box enclosure 68 is preferably comprised of two members (68a and 68b) or half-casings which are, preferably, when joined, shaped like a hollow frustrum, that is, the enclosure is frustro-conical in shape; however, clearly other shapes can be utilized depending on the application. (See, e.g., FIGS. 3A, 3B and 3C) Moreover, the enclosure can be constructed from more than two casings if desired. Each member includes gaskets or seals 72 around the inside top portion, that is, using the preferred embodiment as an example, the narrow end of the frustrum and at the inside bottom portion, that is, the wider end of the frustrum. Each member also includes an attachment means, for example, straps and buckles 71, to secure the enclosure around the valve stuffing boxes. Any means of securing the enclosure can be used including velcro, buckles, latches, wing-nut assemblies, bolts, adhesives, screws, etc. The enclosure shown includes vent plug 69 and detector cylinder 70. In addition, one member of the pair includes lengthwise channels (not shown) for receiving the other member having lengthwise gaskets or seals (not shown). The valve stuffing box enclosure is preferably used in conjunction with the pipe flange connection enclosure described above. Referring to FIGS. 5a and b, the valve stuffing box enclosure 73 of the present invention is designed to overlap and connect or engage with to the pipe flange enclosure 74 to form a heretofore unknown and unrealized combination for the containment and detection of emissions from valve stuffing boxes. This is accomplished by including a channel or groove 75 on the pipe flange connection enclosure whereby the bottom else of the valve stuffing box enclosure sealably sits and secures around the pipe flange enclosure.

The enclosure for valve stuffing boxes of the present invention may be comprised of (a) a casing assembled from two half-casings, shaped to be disposed around the outer configuration of a gland flange and yoke of a valve bonnet, each of the half-casings including a threaded coupling; (b) a resilient upper seal ring affixed around the inner edge of the upper portion of each of the half-casings, designed to create a seal with the upper portion of the yoke; (c) a resilient lower seal ring affixed around the inner edge of the lower portion of each of the half-casings designed to create a seal with the lower portion of the yoke; (d) two resilient gasket seals, disposed along the length of each one of the longitudinal edges of one of the two half-casings; (e) a groove along the length of both longitudinal edges of the other of the two half-casings designed to accept a resilient gasket seal creating a seal between the assembled two said half-casings; (f) four lip gasket seals, each affixed at one of the four abutting corners of one of the two half-casings, to complete a seal between the two half-casings and the yoke of the valve bonnet; (g) means for joining the two half-casings; (h) a cylindrical indicating cartridge, having one open end with outer threads, and having the opposing end sealed with a one-way venting cap, the indicating cartridge is designed to exhibit a change upon exposure to emissions from the valve bonnet, and the open end of the indicating cartridge being threadably disposed in the coupling of one of the half-casings; and (i) a plug threadably disposed in the coupling of the other of the half-casings.

It should also be recognized that the valve stuffing box enclosure, while being described in relation to existing valve stuffing boxes, can also be of an unitary construction and enclosed around the valve stuffing box when it is assembled or connected in the field. The basic construction of the non-unitary enclosure applies equally to the unitary construction.

The valve stuffing box enclosures are preferably made from a standard sheet of aluminum. The valve enclosures have a certain height and circumference depending on manufacture, design, and pressure class. After cutting the sheet material to the desired specification, the material is then rolled per the appropriate configuration. The preferred valve enclosure design requires two halves that will attach to the yoke down to the base of the bonnet on the bolted area where the valve is joined at the body bonnet connection. On each half, there is affixed an extruded gasket comprised of a closed cell sponge or silicone material secured around the top, vertical, and bottom of the two valve enclosure half-casings. The first half-casing of the valve enclosure fits against the yoke and valve bonnet and the other half-casing accepts or fits on the outside of the other half. Each valve enclosure is affixed with simple attachment means to provide a snug fit from top, vertical, and bottom by drawing the two halves together creating a protected environment from outside ambient conditions so that pressure is not contained in the valve enclosure. Preferably, the enclosure contains a hole to accept a vent plug.

Figure 6:
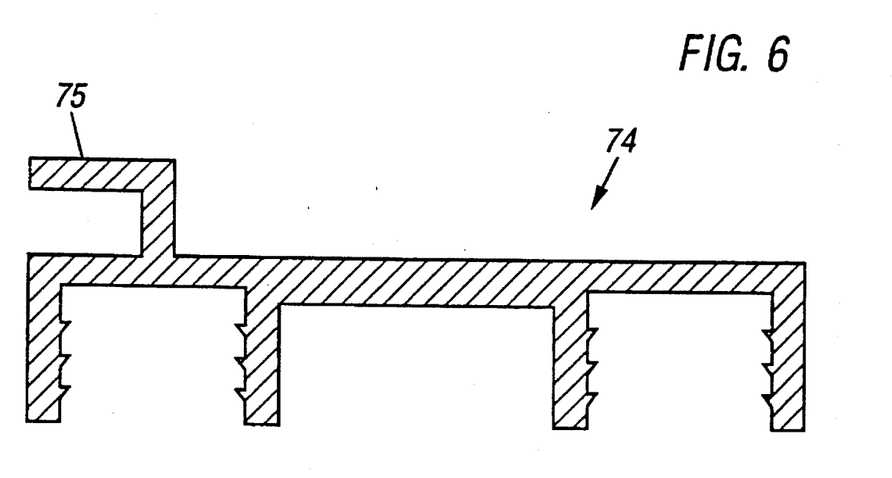
FIG. 6 is a cross-sectional view of the pipe flange connection enclosure for use in conjunction with the valve stuffing box enclosure.

FIG. 6 is a cross-sectional view of pipe flange enclosure 74 having outside channel 75 for use in conjunction with a valve stuffing box enclosure, like enclosure 68 shown in FIG. 5A.

Figure 7:
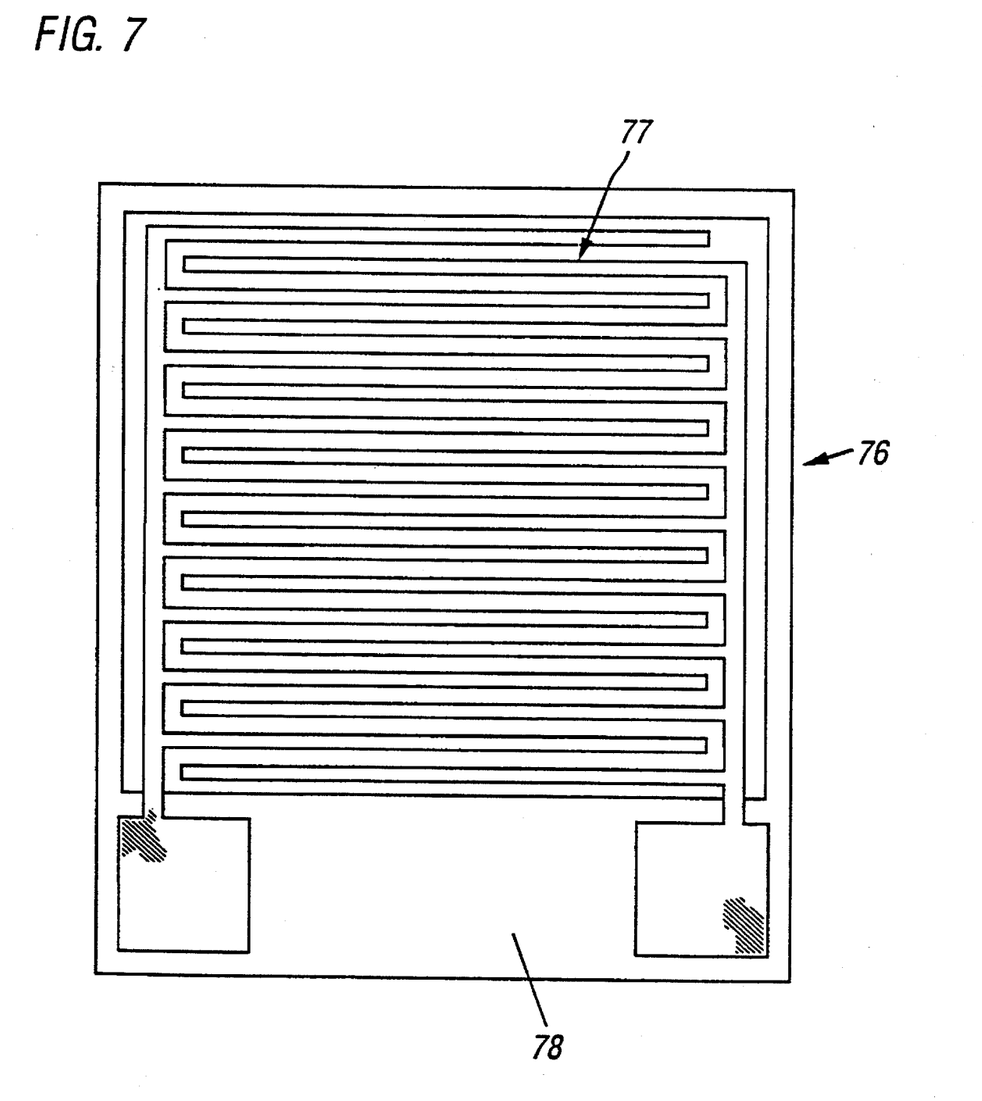
FIG. 7 is a top view of the detector without the carbon-elastomer mixture.

The detectors of the present invention are adsorption detectors. The detector of the present invention is shown in FIG. 7 as 76 and is comprised of a metal substrate, electrode elements, carbon, and an elastomer. In operation, a voltage is supplied across the detector which has a standard resistivity. When the detector is exposed to an emission, of certain substances the resistivity of the detector changes. Referring to FIG. 7, preferably, metal substrate 78 of the detector 76 is comprised of alumina and is approximately 0.025 inches in thickness. Electrode elements 77 are preferably in an inter-digitated configuration. Electrode elements 77 may be formed of gold, platinum, silver, or any other chosen metals and preferably are formed by thick-film metallization. The carbon component (not shown) of the adsorption detector of the present invention may be in the form of particles of substantially uniform size or may be contained in a thick-film ink. Various elastomers (not shown) may be used in the construction of the adsorption detector of the present invention; however, it has been found that silicone-based elastomers are preferred.

Generally, the adsorption detectors of the present invention can be fabricated using micro-electronic fabrication technology. Specifically, photolitographic reduction and thick-film metallization and silk-screening techniques may be used. Indeed, it is preferred that the carbon mixed with the elastomer is placed as a layer onto the surface of the electrode element by silk-screening. It is believed that the thickness of this layer affects the sensitivity of the detector.

It is important to note that the adsorption detector of the present invention, unlike prior art adsorption detectors can detect substances having a Van der Waals' "a" constant of less than about 9 when operated in a non-current saturated mode using carbon particles of substantially uniform size. The term "current saturated mode" as used herein means that small increments in the voltage applied across the detection device do not show the corresponding increases in the current flowing through the device as would otherwise be predicted by Ohm's Law, but instead the current flowing through the device remains substantially constant. Another way of expressing the same, is that in a current saturated mode, voltage is applied to the detection device to a level after which the current no longer increases linearly, that is, it operates in a non-linear region.

The present inventive system also includes a set of transmitters in electrical communication with the set of detectors and the enclosures. The transmitters send signals to one central processing location identifying the status of a particular possible emission site. For example, each transmitter can have its own predetermined programmed identification code and an internal clock to transmit a status report on a predetermined time interval. The system can be set up that in the event a certain transmitter misses a check-in period, the system will allow for a predetermined number of missed check-in times before setting off an alarm. The transmitter useful in the present inventive system preferably is equipped with a low battery transmission signal which notifies the central processing location that the battery or power supply source must be replaced.

An example of a transmitter useful in the present invention operates with a 3.2 volt or 3.5 volt battery power supply and is a one-way R. F. transmitter, i.e, radio frequency, 900 megahertz spread spectrum system which is capable of handling up to 3000 points in a single cell site. The transmitter is in communication with the detector such that when the detector comes into contact with a fugitive emission the electrical resistivity of the detector changes and the transmitter sends an alarm signal. The alarm can be audible, visual, local, and/or at a removed location.

While the illustrative embodiments of the invention have been described with particularity, it will be understood that various other modifications will be apparent to and can be readily made by those skilled in the art without departing from the spirit and scope of the invention. Accordingly, it is not intended that the scope of claims appended hereto be limited to the examples and description set forth herein, but rather that the claims be construed as encompassing all the features of patentable novelty which reside in the present invention, including all features which would be treated as equivalents thereof by those skilled in the art to which the invention pertains.

What is claimed is:

1. A system for the detection of fugitive gas and liquid emissions comprising:

a set of enclosures for emissions sites including pipe flange connections for receiving and collecting said fugitive emissions for detection to detectors of the system, wherein the pipe flange connection enclosures encompass the flange connection, said flange connection comprised of two joined pipe flanges with a gasket in the area between the two flanges, said enclosures having an internal channel such that when the enclosure encompasses the pipe flange connection, the channel forms an enclosure around the gasket area between the joined pipe flanges, said pipe flange enclosures having at least one vent or port to provide nonpressure containing enclosures around said gasket areas by relieving any pressure build-up therein; and a set of detectors for said enclosures, wherein the detectors for the pipe flange connection enclosures are attached such that they are in communication with the enclosed gasket areas.

2. The system of claim 1 wherein the detectors are adsorption detectors comprised of a substrate, electrode elements on said substrate and a layer permeable to said fugitive emissions disposed on top of said elements, said layer comprising particles.

3. The system of claim 1 further comprising valve stuffing box enclosures used in conjunction with the pipe flange connection enclosures on some enclosed sites.

4. A leak detection enclosure for two connected pipe flanges with a gasket in the area between the two flanges, said enclosure comprising:

a set of members having internal channels constructed such that when the members are joined around the pipe flanges, the channels enclose the gasket area between the flanges, said channels having at least one vent or port disposed therein to provide a non-pressure containing enclosure around said gasket area between the flanges.

5. The enclosure of claim 4 wherein said vent is a port located in the channel of one of the members constructed for receiving a fugitive emissions detector.

6. The enclosure of claim 5 further comprising a channel on the outside of the enclosure for receiving a valve stuffing box enclosure.

7. The enclosure of claim 5 wherein the set of members consists of two or more members joined together, each of which are semi-circle shaped.

8. A system for the detection of fugitive gas and liquid emissions from pipe flange connections and valve stuffing boxes comprising:

an enclosure, and an adsorption detector for said enclosure, said detector comprised of a substrate, electrode elements on said substrate, and a layer permeable to said fugitive emissions disposed superjacent said elements having mixed therein particles of substantially uniform size, wherein said detector exhibits a measurable electrical resistance change upon exposure to said fugitive emissions collected within said enclosure, and is capable of detecting substances having a Van der Waals' "a" constant of less than about 9 during operation in a non-current saturated mode.

9. The system of claim 8 wherein the particles in the layer are comprised of carbon.

10. The system of claim 8 wherein the enclosure is a pipe flange enclosure.

11. The system of claim 8 wherein the enclosure is a valve stuffing box enclosure.

12. The system of claim 8 wherein the layer superjacent the electrode elements is comprised of elastomers.

13. The system of claim 8 wherein the enclosure is comprised of a combination of a pipe flange enclosure and a valve stuffing box enclosure.

14. The system of claim 8 wherein the particles mixed in the layer superjacent the electrode elements are adsorbent of fugitive emissions leaking from said pipe flange connections and valve stuffing boxes.

* * * * *